April 14, 1942.  A. BOCH  2,279,967
STEREOSCOPIC FILM VIEWING APPARATUS
Filed April 17, 1941   2 Sheets-Sheet 1
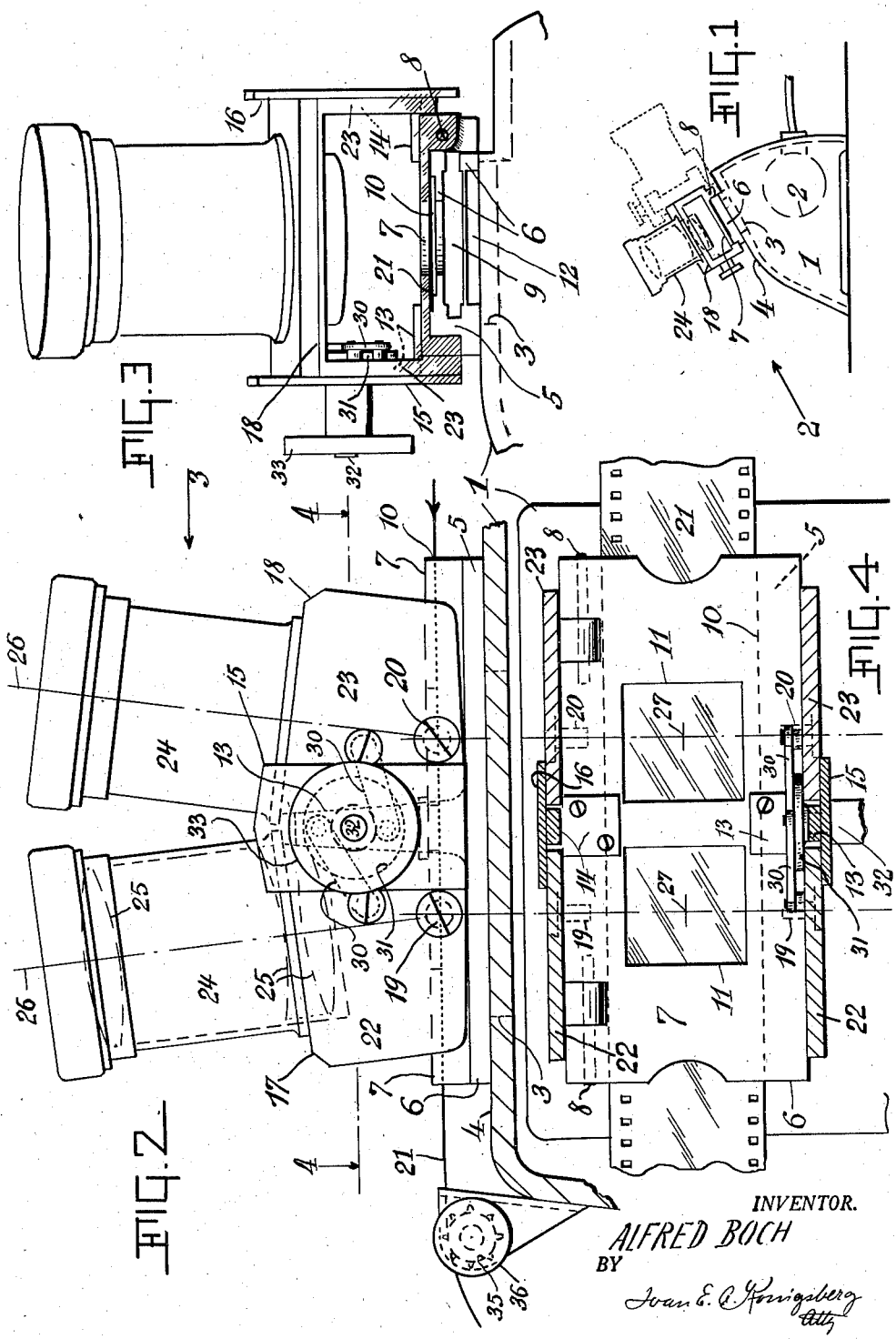
INVENTOR.
ALFRED BOCH
BY
Ivan E. A. Konigsberg
Atty April 14, 1942.  A. BOCH  2,279,967
STEREOSCOPIC FILM VIEWING APPARATUS
Filed April 17, 1941  2 Sheets-Sheet 2
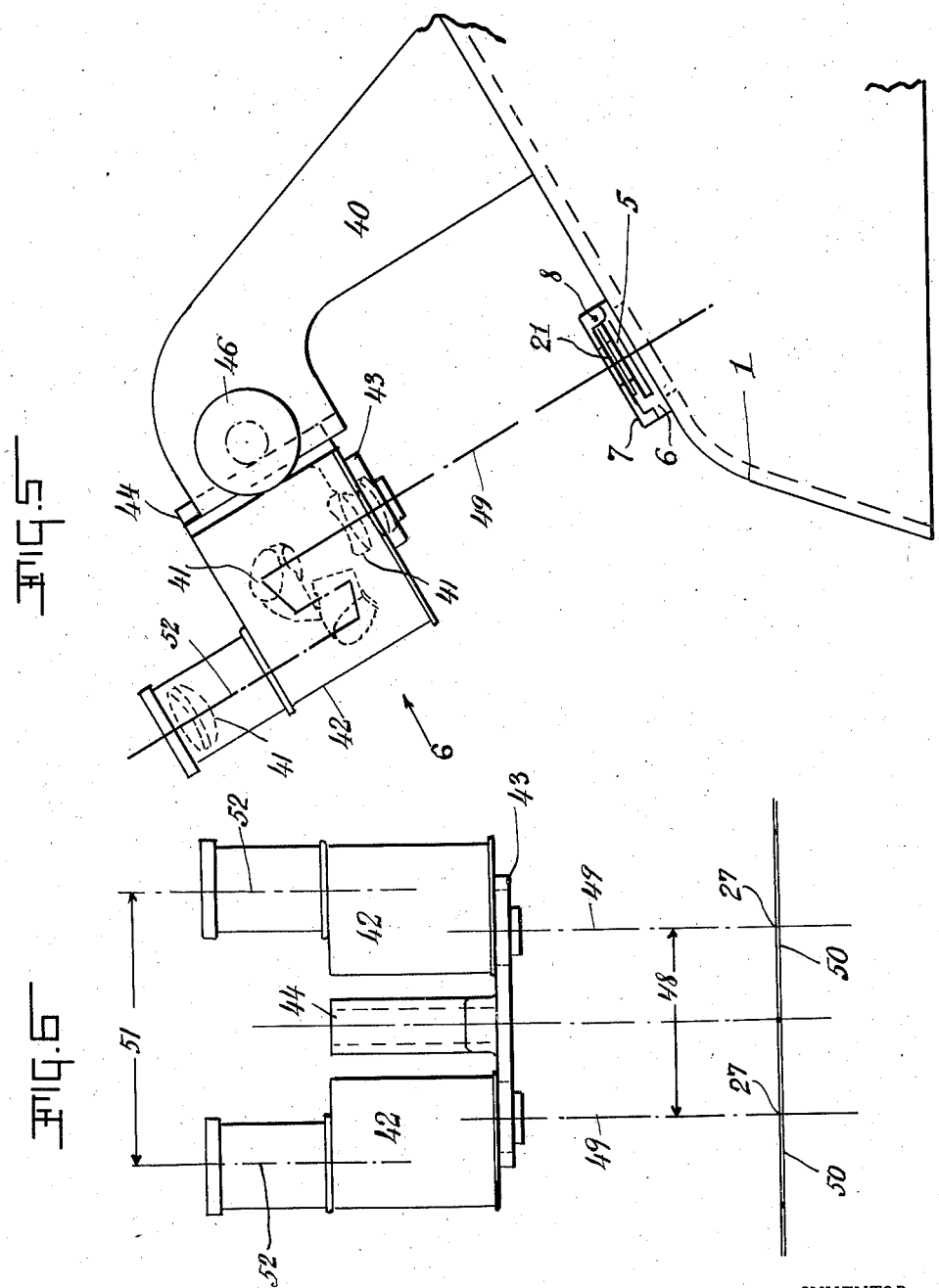
INVENTOR.
ALFRED BOCH
BY
Ivan E. A. Konigsberg
Atty Patented Apr. 14, 1942

2,279,967

UNITED STATES PATENT OFFICE 2,279,967

STEREOSCOPIC FILM VIEWING APPARATUS

Alfred Boch, Yorktown Heights, N. Y.

Application April 17, 1941, Serial No. 388,925

3 Claims. (Cl. 88—29)

This invention relates to improvements in apparatus for viewing stereoscopic photographic film record negatives of X-ray pictures, fluorograms and the like. Such records are made upon photographic films and the pictures are taken by stereoscopic cameras. The viewing apparatus must therefore include a stereoscopic optical system. The records are made upon standard 35 mm. film and each view or picture is about 37.5 mm. long upon the developed film, the additional length being due to expansion. Inasmuch as the views upon the film follow one upon the other in close succession without spacing it follows that the optical axes of the stereoscopic optical viewing system must be spaced about 37.5 mm. apart in the plane of view. On the other hand provision must be made for adjusting the oculars of such system to suit the eyes of the observer with respect to pupillary distance.

The object of the invention is to provide a very simple practical apparatus for stereoptically viewing stereoscopic views. The invention is embodied in an apparatus which includes a base having an inclined top surface with means for positioning the film or a latern slide to be viewed beneath a pair of inclined tubes each of which contains an optical magnifying system. The tubes are arranged so that their optical axes are about 37.5 mm. apart in the viewing plane. They are pivoted so as to be adjustable to suit the eyes of the observer. As a modification the optical system may consist of a pair of image erecting prism telescopes of the type used in binoculars. The axes in such systems are offset and perpendicular to the objective plane. The offset ocular optical axes of such a system are adjustable to suit the eyes of the observer. Other features of the invention will be pointed out hereinafter. In the accompanying drawings illustrating the invention Fig. 1 is an outline view of the apparatus with details omitted and showing the optical system in two different positions.

Fig. 2 is a view looking in the direction of the arrow 2 in Fig. 1 with parts in section and parts broken away.

Fig. 3 is an end view of the apparatus looking in the direction of the arrow 3 in Fig. 2.

Fig. 4 is a plan view taken substantially on the line 4—4 of Fig. 2.

Fig. 5 illustrates diagrammatically a modified optical system mounted upon the base of the apparatus.

Fig. 6 is an outline view of parts shown in Fig. 5 looking in the direction of the arrow 6 therein.

Referring to Figs. 1 to 4 the apparatus comprises a hollow base 1 which supports an electric lamp 2 the light of which passes upwards through an opening 3 in the inclined top of the base. Upon the latter is mounted a film guiding and positioning unit 5 which is made in two parts, a lower fixed part 6 and an upper part 7 which is hinged to the lower part 6 as at 8. The latter also forms a lantern slide guide way 9. Both parts of the member 5 forms a film guide way 10 in the plane where the two parts meet as shown in Fig. 3. The upper hinged part 7 is shaded in this figure for the sake of distinguishing it from the lower part 6. Both of the guide ways have superposed alined viewing openings 11, 11 Fig. 4, the film being lighted from below as will be understood. The space marked 12 in Fig. 3 is of no significance, the guide ways merely being raised a suitable distance. It is a matter of construction.

The hinged upper part 7 of the unit 5 carries two opposed brackets or supports 13 and 14. On the outside of these supports there are secured guide plates 15 and 16. Two tube supporting bridges 17 and 18 are pivoted to the hinged part 7 at 19 and 20, respectively, on opposite sides of the part 7 as shown in Fig. 4. The axes of the pivots 19 and 20 are in the optical viewing plane of the apparatus, i. e. in the plane of the film 21. The vertical arms 22 and 23 of the bridges 17 and 18 respectively are guided about their pivots between the outsides of the unit 5 and the insides of the plates 15 and 16, Fig. 4.

Each bridge 17 and 18 supports a tube 24 containing an optical magnifying system for example consisting of three lenses as indicated at 25. The lenses are chromatically corrected and of wide angles of view so the pictures may be viewed very close. The eyes of the observer may be close or further away from the oculars of the lenses. The optical axes of the two magnifiers 24 are indicated by the lines 26, 26 and pass through the pivots 19 and 20 and through the centers of the two adjoining stereoscopic film views which are indicated at 27, 27 in Fig. 4.

In order to adjust the magnifiers to suit the eyes of the observer the two tubes 24 are linked together by links 30, 30 pivoted to the tubes and to a disk 31 which in turn is rotatably mounted on the support 13. The pivot 32 of the disk extends to the outside and carries a hand wheel 33. By rotating this wheel the disk 31 is rotated and the two tubes correspondingly and equally adjusted towards each other, the optical axes at all times passing through the pivots 19 and 20 respectively. The magnifiers are focusable in a well known manner not specially indicated.

When a film is to be examined it is inserted in the film guide way 10 and moved in under the two viewing openings 11. The magnifiers may then be adjusted to suit. The views are seen stereoscopically. The operator may move the film through the guide with one hand to the correct position and turn the disk wheel 33 with the other hand for adjustment. The film is led out of the apparatus at one side and may then be engaged by a transporting roller 35 operable by a knob 36. This serves as a means also for accurately positioning the film beneath the magnifiers. Also the roller 35 may be operated to feed the film to a film winding up drum, not shown.

The film may be so short that it cannot conveniently be passed through the guide way from side to side of the apparatus. In order to place such a short film in viewing position the entire upper part of the viewing unit is opened by being tilted backwards upon the pivot 8 as shown in Fig. 1 in dotted lines. This movement uncovers the bottom part of the film guide. The film may then be placed in position sideways and the unit closed down. A lantern slide or a film between two glass plates may easily be inserted in the guide way 9 and pushed into view.

Figs. 5 and 6 illustrate the same apparatus but provided with a different optical system. In this case there is secured to the base 1 an upright bracket 40 like the upright in a microscope. A pair of image erecting telescope optical lens systems generally marked 41, 41 is mounted upon a base plate 43. The lens casings are marked 42, 42. The plate 43 has a foot 44 adapted to fit in and to be received by the bracket 40 as shown in Fig. 5 so as to be movable therein in a direction perpendicular to the plane of the film 21. The parts are arranged as in a microscope so that by means of suitable gearing, not shown, and a hand wheel 46, the base plate is moved whereby to focus the optical systems. The guiding means for the film are the same as shown in the preceding figures. As seen in Fig. 6 the distance 48 between the objective axes 49, 49 of the optical system is about equal to the 37.5 mm. distance between the centers 27, 27 of the film pictures 50, 50. The distance 51 between the offset ocular axes 52 is adjusted to suit the eyes of the observer by rotating the casings 42, 42 about the axes 49 in the base plate as will be understood, said casings being rotatably so mounted in the plate. The views are seen stereoscopically.

The apparatus is small and very handy for examining the stereoscopic film pictures. The views are seen stereoscopically and may be rapidly inspected. The apparatus is of special usefulness in modern health services where mass surveys are undertaken for diagnosis.

I claim:

1. In an apparatus for stereoscopically viewing stereoscopic film negatives having adjoining edges, a base, means on said base for placing thereupon said film negatives in position to be viewed, an optical system for stereoscopically viewing said film negatives comprising a pair of optical image forming elements, fixed means on said base for supporting said elements in viewing relation to said film negatives with the lower ends of the optical axes thereof passing through the centers of the adjoining film negatives, the upper ends of said optical axes being angularly adjustable with respect to said centers and means for adjusting the upper ends of said optical axes whereby to adjust said optical axes to suit the spacing of the eyes of an observer.

2. In an apparatus for stereoscopically viewing stereoscopic film negatives having adjoining edges, a base, means on said base for placing thereupon said film negatives in position to be viewed, an optical system for stereoscopically viewing said film negatives comprising a pair of optical image forming elements, pivot means for individually supporting each of said elements upon said base in angularly adjustable film viewing relation, said pivot means being located in the plane of the film to be viewed and in the planes of the optical axes of said elements respectively, movable adjusting means connecting said elements and a wheel for actuating said adjusting means whereby to adjust said elements about their said pivot means to suit the spacing of the eyes of an observer.

3. In an apparatus for stereoscopically viewing consecutive stereoscopic film negatives having contiguous edges, the consecutive central points of said negatives being in fixed spaced relation, a base, means on said base for placing thereupon said film negatives in position to be viewed, an optical system for stereoscopically viewing said film negatives comprising a pair of image erecting optical telescopes, each of which includes a lower fixed portion and an upper adjustable portion, the optical axis of each of said telescopes passing through the said portions in off-set relation thereto and means for supporting said telescopes in viewing relation to the said film negatives with the lower portions of their said optical axes respectively in fixed spaced relation passing through the centers of a pair of contiguous film negatives to be viewed.

ALFRED BOCH.